(12) United States Patent
Su

(10) Patent No.: US 9,688,298 B1
(45) Date of Patent: Jun. 27, 2017

(54) CONVERTIBLE HAND TRUCK

(71) Applicant: Chung-Hsiu Su, Kaohsiung (TW)

(72) Inventor: Chung-Hsiu Su, Kaohsiung (TW)

(*) Notice: Subject to any disclaimer, the term of this patent is extended or adjusted under 35 U.S.C. 154(b) by 0 days.

(21) Appl. No.: 15/295,123

(22) Filed: Oct. 17, 2016

(51) Int. Cl.
*B62B 3/02* (2006.01)
*B62B 1/00* (2006.01)
*B62B 1/12* (2006.01)
*B62B 1/20* (2006.01)

(52) U.S. Cl.
CPC .............. *B62B 1/002* (2013.01); *B62B 1/125* (2013.01); *B62B 1/208* (2013.01); *B62B 3/02* (2013.01); *B62B 2205/20* (2013.01); *B62B 2206/006* (2013.01); *B62B 2206/02* (2013.01); *B62B 2206/06* (2013.01)

(58) Field of Classification Search
None
See application file for complete search history.

(56) References Cited

U.S. PATENT DOCUMENTS

| | | | | |
|---|---|---|---|---|
| 3,729,209 A | * | 4/1973 | Litz | B62B 3/02 280/47.2 |
| 3,850,441 A | * | 11/1974 | Peters | B62B 1/08 280/47.2 |
| 3,873,118 A | * | 3/1975 | Takagi | B62B 1/002 280/47.2 |
| 4,009,891 A | * | 3/1977 | Jensen | B62B 1/002 280/47.2 |
| 4,239,249 A | * | 12/1980 | Sprague | B62B 1/002 280/47.2 |
| 4,284,286 A | * | 8/1981 | Lewallen | B62B 1/002 280/30 |
| 4,728,245 A | * | 3/1988 | Shelton | B62B 3/0618 280/47.2 |
| 4,921,270 A | * | 5/1990 | Schoberg | B62B 1/002 280/47.27 |
| 4,978,132 A | * | 12/1990 | Wilson | B62B 3/108 269/17 |
| 5,160,153 A | * | 11/1992 | Zan | B62B 5/02 280/43.1 |
| 5,207,439 A | * | 5/1993 | Mortenson | B62B 1/002 280/47.2 |
| 5,246,239 A | * | 9/1993 | Braden | B62B 1/06 280/47.24 |
| 5,277,439 A | * | 1/1994 | Pipes | B62B 1/20 280/47.2 |
| 5,322,143 A | * | 6/1994 | Curran | B66F 7/065 187/211 |

(Continued)

*Primary Examiner* — J. Allen Shriver, II
*Assistant Examiner* — Hilary L Johns
(74) *Attorney, Agent, or Firm* — Muncy, Geissler, Olds & Lowe, P.C.

(57) ABSTRACT

A convertible hand truck includes first and second truck frames coupled with each other through a pair of fixed members and a pair of pivoting members such that the second truck frame is turnable relative to the first truck frame among a folded position, a platform-cart position and a reclined-truck position. A stabilizing lever is pivotably connected with the second truck frame or the pivoting members to be engaged with or disengaged from the fixed members in response to the turning of the second truck frame. The second truck frame extends outwardly from the first truck frame in the reclined-truck position so as to expand and enlarge the carrying area of the hand truck for more loads.

10 Claims, 22 Drawing Sheets

(56) References Cited

U.S. PATENT DOCUMENTS

| | | | | |
|---|---|---|---|---|
| 5,445,399 | A * | 8/1995 | Salvucci, Sr. | B62B 1/002 280/47.2 |
| 5,474,312 | A * | 12/1995 | Starita | B62B 3/10 280/47.19 |
| 5,536,034 | A * | 7/1996 | Miller | B62B 1/002 108/11 |
| 5,810,373 | A * | 9/1998 | Miranda | B62B 1/002 248/354.1 |
| 5,836,595 | A * | 11/1998 | Brice | B62B 1/12 182/20 |
| 6,273,438 | B1 * | 8/2001 | Prapavat | B62B 1/12 280/47.2 |
| 6,328,319 | B1 * | 12/2001 | Stahler, Sr. | B62B 1/002 280/47.18 |
| 6,341,788 | B1 * | 1/2002 | Ciccone | B25H 1/00 280/47.28 |
| 6,364,328 | B1 * | 4/2002 | Stahler, Sr. | B62B 1/002 280/47.18 |
| 6,488,304 | B2 * | 12/2002 | Krawczyk | B62B 1/002 280/408 |
| 6,530,583 | B1 * | 3/2003 | Mueller | B23D 47/025 144/286.5 |
| 6,758,482 | B2 * | 7/2004 | Stallbaumer | B62B 1/125 280/47.18 |
| 6,880,835 | B2 * | 4/2005 | Tornabene et al. | B62B 1/002 182/20 |
| 7,163,213 | B2 * | 1/2007 | Chambers | B62B 1/002 180/209 |
| 7,255,355 | B2 * | 8/2007 | Chisholm | B25H 1/04 248/439 |
| 7,380,778 | B2 * | 6/2008 | Lawrence | B25H 1/04 269/139 |
| 7,588,255 | B2 * | 9/2009 | Katz | A47B 3/08 280/47.18 |
| 8,100,430 | B2 * | 1/2012 | Meyers | B62B 1/002 280/30 |
| 8,360,444 | B2 * | 1/2013 | Colacecchi | B62B 1/002 280/47.18 |
| 8,366,124 | B1 * | 2/2013 | Caldwell | B62B 1/20 280/30 |
| 8,413,999 | B2 * | 4/2013 | Nassaux | B62B 1/002 280/47.16 |
| 8,448,956 | B2 * | 5/2013 | Wise | B25H 1/04 280/30 |
| 8,550,476 | B1 * | 10/2013 | Whinnery | B62B 1/12 280/47.18 |
| 9,150,233 | B2 * | 10/2015 | Su | B62B 3/022 |
| 9,321,471 | B1 * | 4/2016 | Gedeon-Janvier | B62B 1/002 |

* cited by examiner

CONVERTIBLE HAND TRUCK

FIELD

The disclosure relates to a hand truck, and more particularly to a convertible hand truck configured to be a two-wheeled reclined hand truck and a four-wheeled platform cart.

BACKGROUND

Referring to FIGS. 1 and 2, a conventional convertible hand truck includes a truck frame 11 for loading, a toe plate 14 transversely disposed on an end of the truck frame 11, a first wheel unit 12 with two wheels 121 disposed adjacent to the toe plate 14, a second wheel unit 13, and a push handle 15. The second wheel unit 13 includes two wheel supports 132 each connected to the first wheel unit 12 and the truck frame 11 respectively through an extensible frame 133 and a pivotable link 134 for supporting a roller 131. The extensible frame 133 includes extensible outer and inner tubes 135, 136 so as to permit movement of the wheel supports 132 relative to the first wheel unit 12. Thus, the hand truck is convertible between a reclined hand truck state (see FIG. 1) and a platform cart state (see FIG. 2). The push handle 15 has a handle body 151 connected to the truck frame 11 through a pivotable support 152 and having a handgrip end 154 and a sliding end 153. The sliding end 153 is slidably engaged in a guiding rail 111 of the truck frame 11 such that the push handle 15 is movable relative to the truck frame 11 between a retracted position (see FIG. 1) and an extended position (see FIG. 2) for facilitating gripping during the use of the hand truck as a platform cart.

However, since the truck frame 11 in the reclined hand truck state is supported by the pivotable link 134 which is pivotably connected to both the truck frame 11 and the wheel support 132, the truck frame 11 tends to collapse due to the loading thereon and undesirably switch to the platform cart state, thereby causing damage to the loading and injury to a user. Additionally, in the reclined hand truck state, the push handle 15 is retracted into the truck frame 11 and is not extendable from the truck frame 11 to elongate the length of the loading area.

SUMMARY

Therefore, an object of the disclosure is to provide a convertible hand truck that can alleviate at least one of the drawbacks of the prior art.

According to the disclosure, the convertible hand truck includes a first truck frame having a pair of first pivot end portions opposite to each other in a left-and-right direction, and a pair of first end portions disposed opposite to the first pivot end portions, respectively, in a first direction transverse to the left-and-right direction. A second truck frame has a pair of second pivot end portions opposite to each other in the left-and-right direction, and a pair of second end portions disposed opposite to the second pivot end portions, respectively, in a second direction transverse to the left-and-right direction. A pair of fixed members are disposed outboard of the first pivot end portions, respectively. A pair of pivoting members are disposed outboard of the second pivot end portions, respectively. Each of the pivoting members is pivotably connected with a respective one of the fixed members about a first pivot axis in the left-and-right direction such that the second truck frame is turnable relative to the first truck frame among a folded position, where the second end portions are close to the first end portions to coincide the second direction with the first direction, a platform-cart position, where the second direction is transverse to the first direction, and a reclined-truck position, where the second end portions are remote from the first end portions to coincide the second direction with the first direction. Each of the fixed members has a platform-cart positioning groove and a reclined-truck positioning groove angularly displaced from each other about a second pivot axis that is parallel to and offset from the first pivot axis. A stabilizing lever is pivotably connected with either the second truck frame or the pivoting members about the second pivot axis, and has a weight end and a power end which are disposed at two opposite sides of the second pivot axis such that the weight end is disposed to be engaged with respective ones of the platform-cart positioning grooves and the reclined-truck positioning grooves when the second truck frame is in a respective one of the platform-cart position and the reclined-truck position, and such that, in response to a turning movement of the second truck frame about the first pivot axis, the power end is turned about the second pivot axis to move the weight end toward respective ones of the platform-cart positioning grooves and the reclined-truck positioning grooves, and, in response to a turning movement of the power end, the weight end is disengaged from the respective ones of the platform-cart and reclined-truck positioning grooves to permit the turning movement of the second truck frame toward the folded position. A wheel unit is coupled with the first end portions. A roller unit is coupled with ones of the first pivot end portions, the second pivot end portions and the pivoting members.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
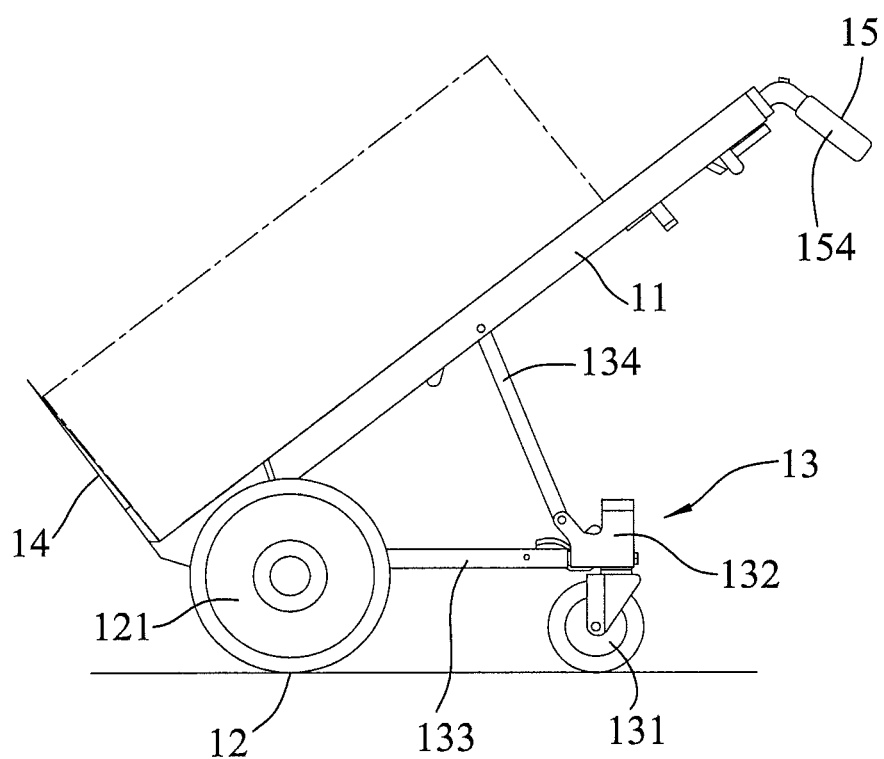
FIG. 1 is a schematic side view of a conventional convertible hand truck in a reclined hand truck state.
Figure 2:
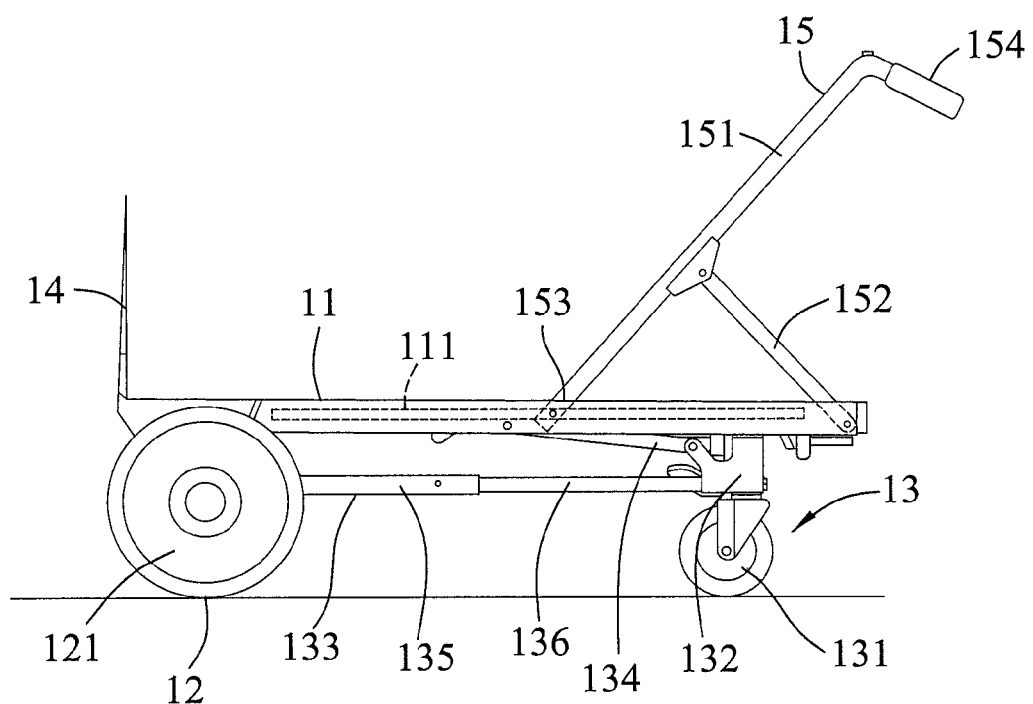
FIG. 2 is a schematic side view of the conventional hand truck in a platform cart state.
Figure 3:
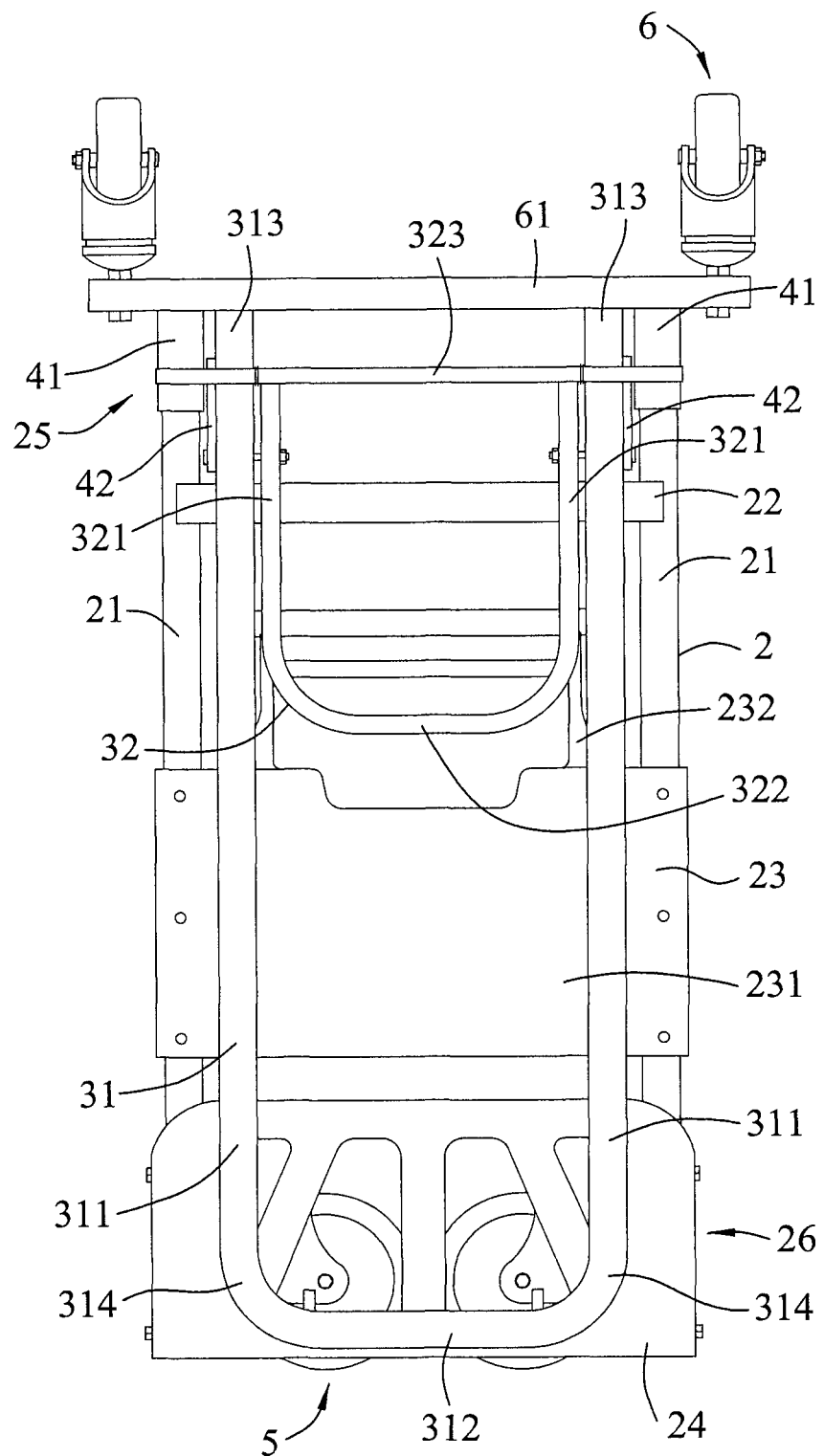
FIG. 3 is a schematic front view illustrating that a first embodiment of a convertible hand truck according to the disclosure is in a folded state.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 3 to 6, the first embodiment of the convertible hand truck according to this disclosure includes a first truck frame 2, a second truck frame 31, a pair of fixed members 41, a pair of pivoting members 42, a stabilizing lever 32, a wheel unit 5 and a roller unit 6.

The first truck frame 2 includes a pair of side rails 21 disposed opposite to each other in a left-and-right direction and each having a first pivot end portion 25 and a first end portion 26 opposite to each other in a first direction transverse to the left-and-right direction, a crossbar 22 extending between the side rails 21, a middle plate 23 transversely disposed on the side rails 21, and a toe plate 24 pivotably connected to the side rails 21 adjacent to the first end portions 26. The middle plate 23 includes a plate body 231 and a U-shaped frame 232 connected to the plate body 231 to define a recess 233.

The second truck frame 31 has a pair of first side rods 311 spaced apart from each other in the left-and-right direction and each extending in a second direction transverse to the left-and-right direction to have a second pivot end portion 313 and a second end portion 314, and a first grip rod 312 extending and interconnecting the second end portions 314.

Each of the fixed members 41 is disposed on a respective one of the side rails 21 and outboard of a respective one of the first pivot end portions 25.

Each of the pivoting members 42 is connected to a respective one of the first side rods 311 and outboard of a respective one of the second pivot end portions 313. Each of the pivoting members 42 is pivotably connected with a respective one of the fixed members 41 about a first pivot axis in the left-and-right direction such that the second truck frame 31 is turnable relative to the first truck frame 2 among a folded position (see FIG. 5), where the second end portions 314 are close to the first end portions 26 to coincide the second direction with the first direction, a platform-cart position (see FIG. 8), where the second direction is transverse to the first direction, and a reclined-truck position (see FIG. 9), where the second end portions 314 are remote from the first end portions 26 to coincide the second direction with the first direction. The conversion of the hand truck will be described in greater detail in the succeeding paragraphs. Each of the pivoting members 42 has a recess 421.

Each of the fixed members 41 has a platform-cart positioning groove 414 and a reclined-truck positioning groove 415 angularly displaced from each other about a second pivot axis that is parallel to and offset from the first pivot axis, and first, second and middle arcuate surfaces 412, 413, 411 angularly spaced from each other about the second pivot axis by the platform-cart and reclined-truck positioning grooves 414, 415.

Figure 5:
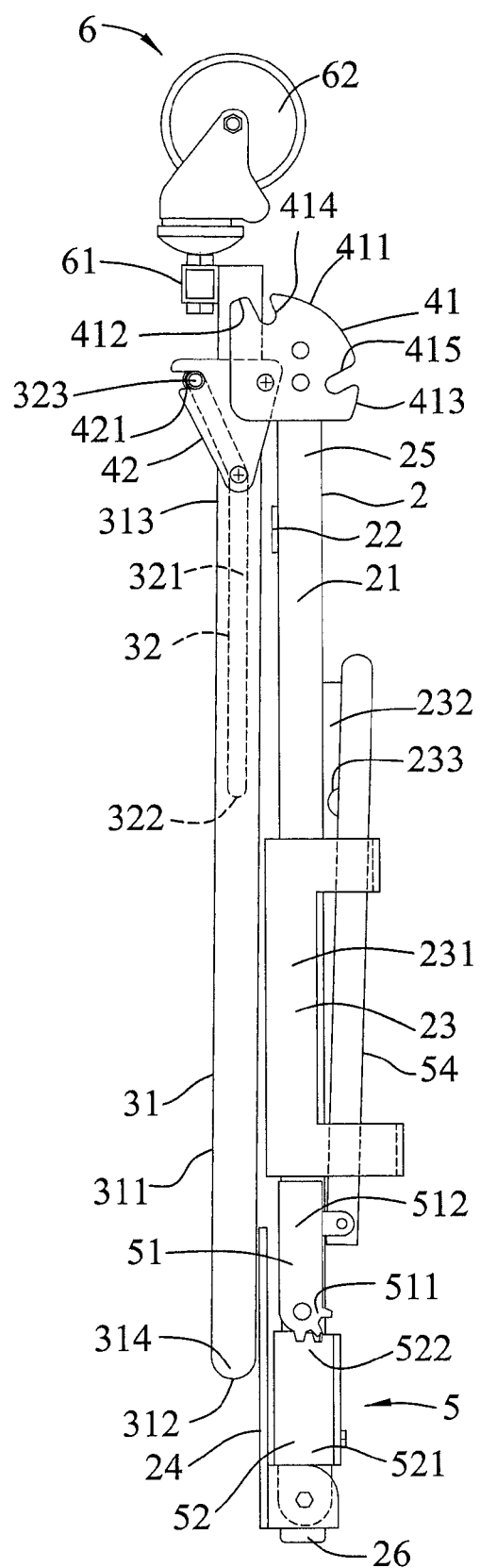
FIG. 5 is a schematic side view of the first embodiment in the folded state.
Figure 6:
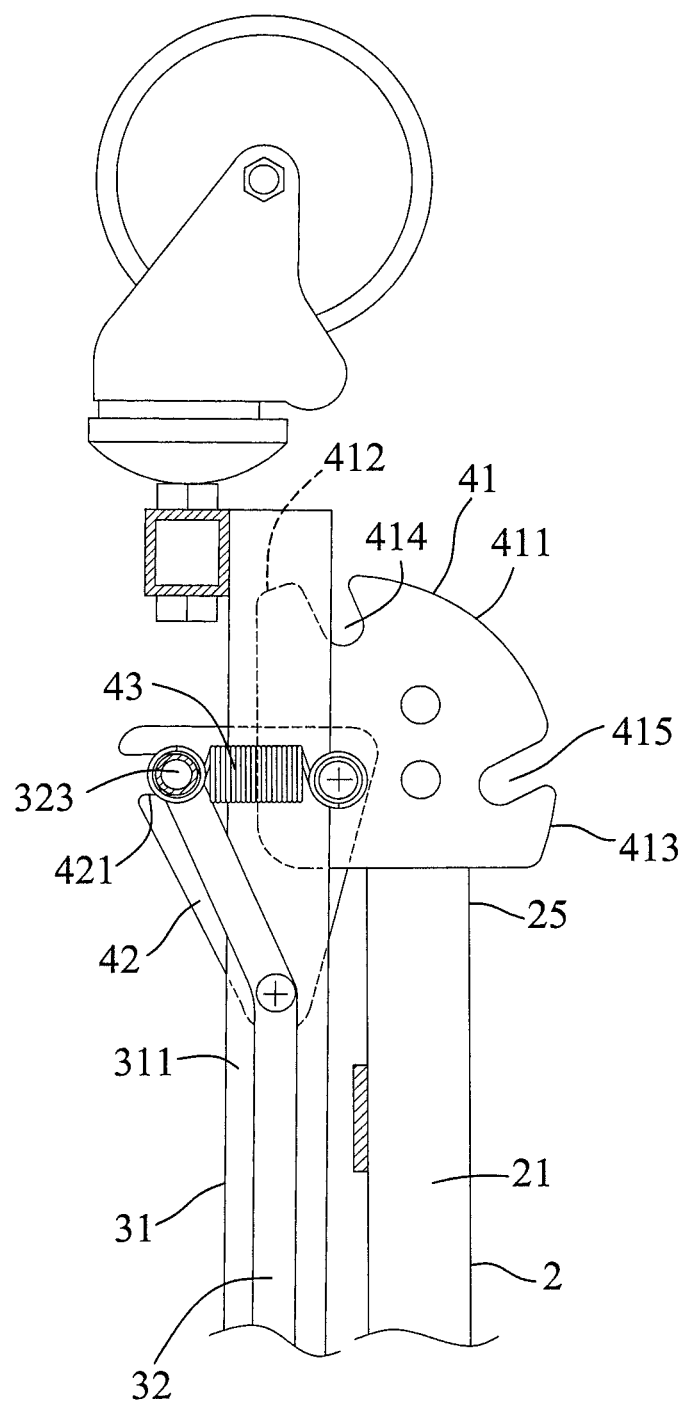
FIG. 6 is a fragmentary, partly sectional view of the first embodiment in the folded state.

The stabilizing lever 32 has a pair of second side rods 321 which are respectively and pivotably connected with the first side rods 311 about the second pivot axis, an engaging crossbar 323 which interconnects ends of the second side rods 321 to serve as a weight end of the lever 32, and a gripping crossbar 322 which interconnects opposite ends of the second side rods 321 to serve as a power end of the lever 32. The second side rods 321 are shorter than the first side rods 311. The engaging crossbar 323 is designed to be longer than the gripping crossbar 322 to have two end portions extending outwardly of the second truck frame 31. As shown in FIG. 5, in the folded position, the engaging crossbar 323 is retained in the recesses 421 of the pivoting members 42.

A biasing spring 43 is disposed between the engaging crossbar 323 and the respective fixed member 41 to bias the engaging crossbar 323 toward the fixed members 41 so as to engage the engaging crossbar 323 in respective ones of the platform-cart and reclined-truck positioning grooves 414, 415.

Figure 4:
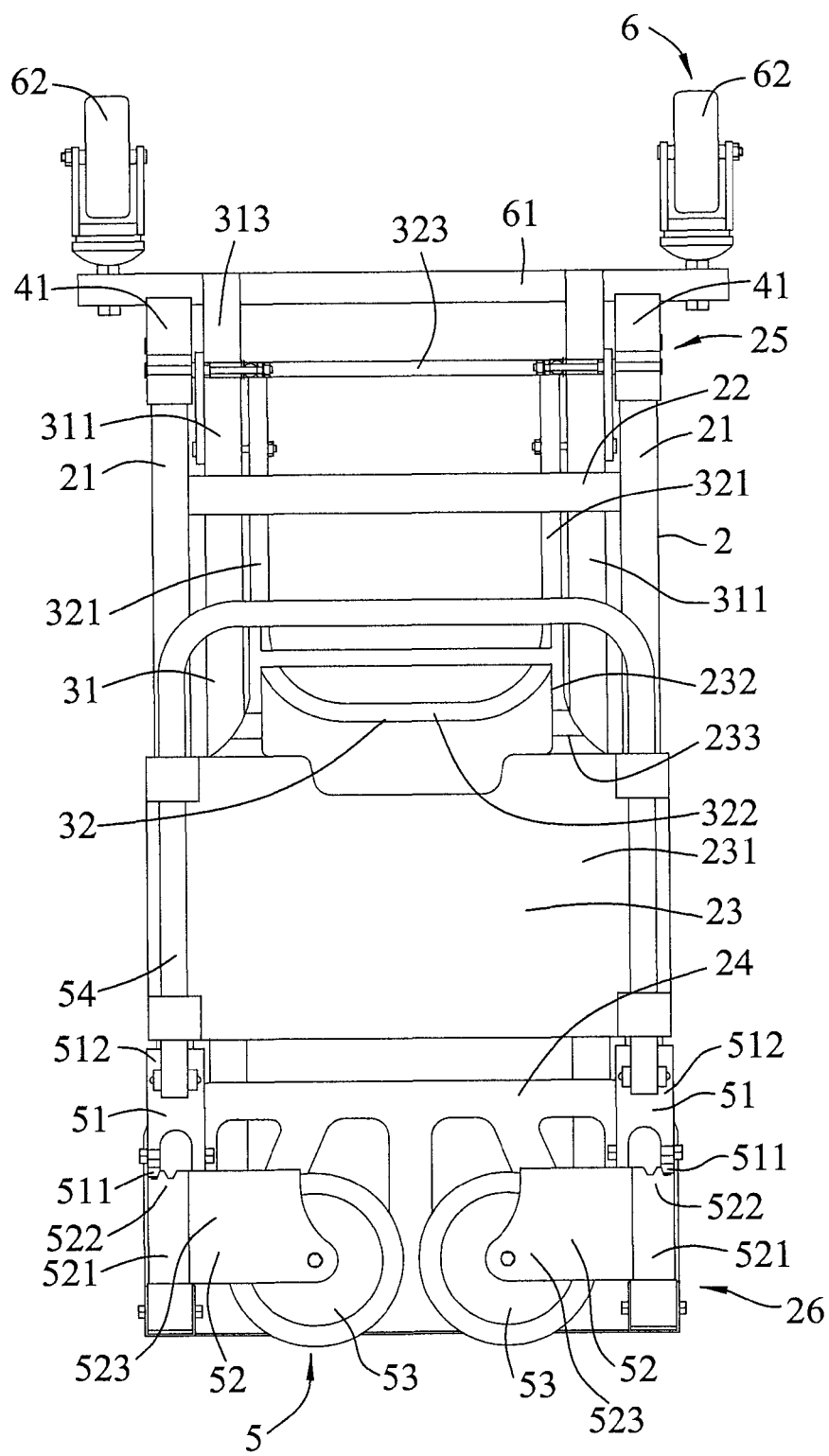
FIG. 4 is a schematic rear view of the first embodiment in the folded state.
Figure 7:
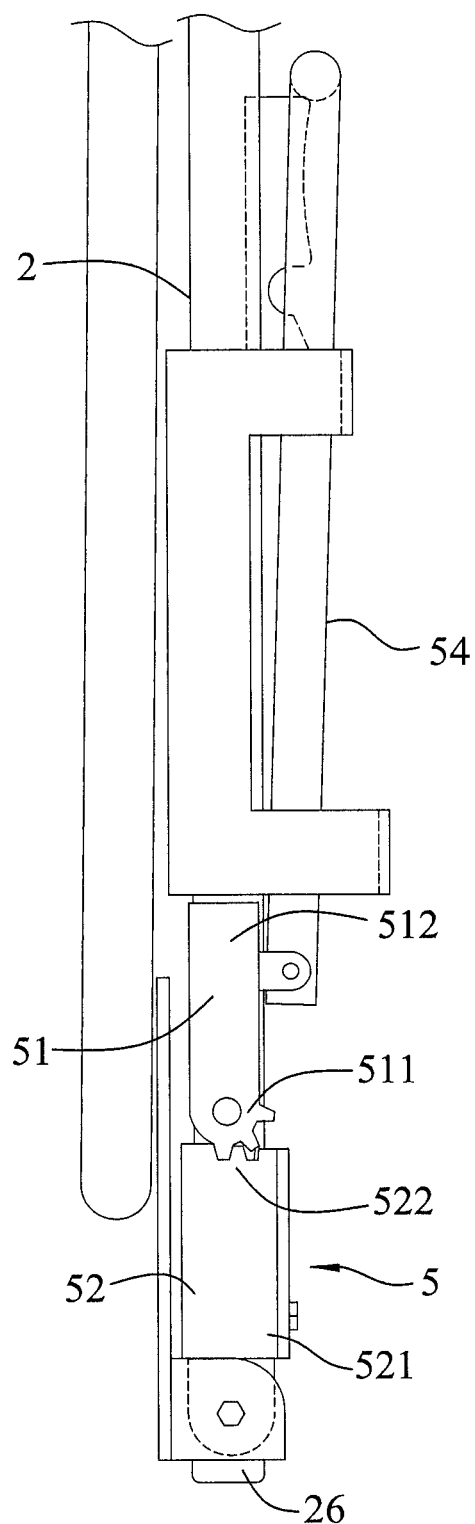
FIG. 7 is a fragmentary, schematic side view of the first embodiment in the folded state.

With reference to FIGS. 4, 5 and 7, the wheel unit 5 is coupled with the first end portions 26 of the first truck frame 2, and includes a pair of rotary members 51 each pivotably mounted on the first end portion 26 of the first truck frame about a rotary axis in the left-and-right direction, a pair of wheel mounts 52 each sleeved on the first end portion 26, two wheels 53 respectively and pivotably mounted on the wheel mounts 52, and a driving member 54. Specifically, each of the rotary members 51 has a teethed portion 511 meshed with a teethed portion 522 of the respective wheel mount 52, and a connecting portion 512 opposite to the teethed portion 511. Each of the wheel mounts 52 has a sleeve portion 521 sleeved on the first end portion 26 to permit turning of the wheel mounts 52 about the first end portions 26 so as to move the wheels 53 remote from each other, and a pivoting portion 523 for the wheel 53 to be pivotably mounted thereon. The driving member 54 is of a U-shaped rod having at two ends a connecting portion which is connected to the connecting portions 512 of the rotary members 51, and an opposite operating portion which is disposed close to the first pivot end portions 25 for manual operation.

The roller unit 6 is coupled with the second pivot end portions 313 of the second truck frame 31. Specifically, the roller unit 6 includes a roller mounting crossbar 61 interconnecting the second pivot end portions 313, and two rollers 62 rotatably mounted on the roller mounting crossbar 61. The roller mounting crossbar 61 is soldered with the first side rods 311 and has a length larger than the width of the first truck frame 2 such that the rollers 62 are disposed outboard of the first truck frame 2.

Figure 8:
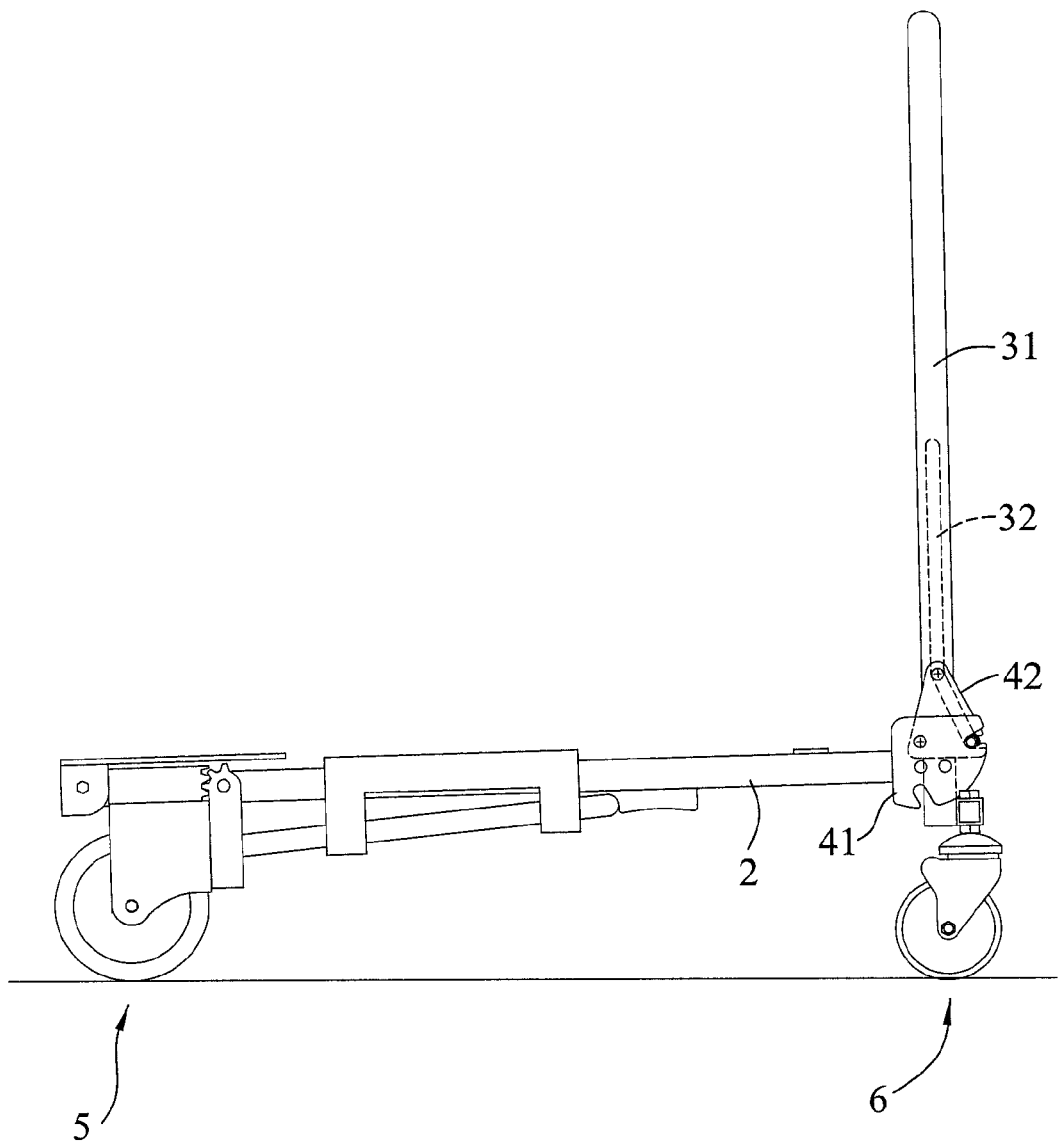
FIG. 8 is a schematic side view illustrating the first embodiment in a platform cart state.
Figure 10:
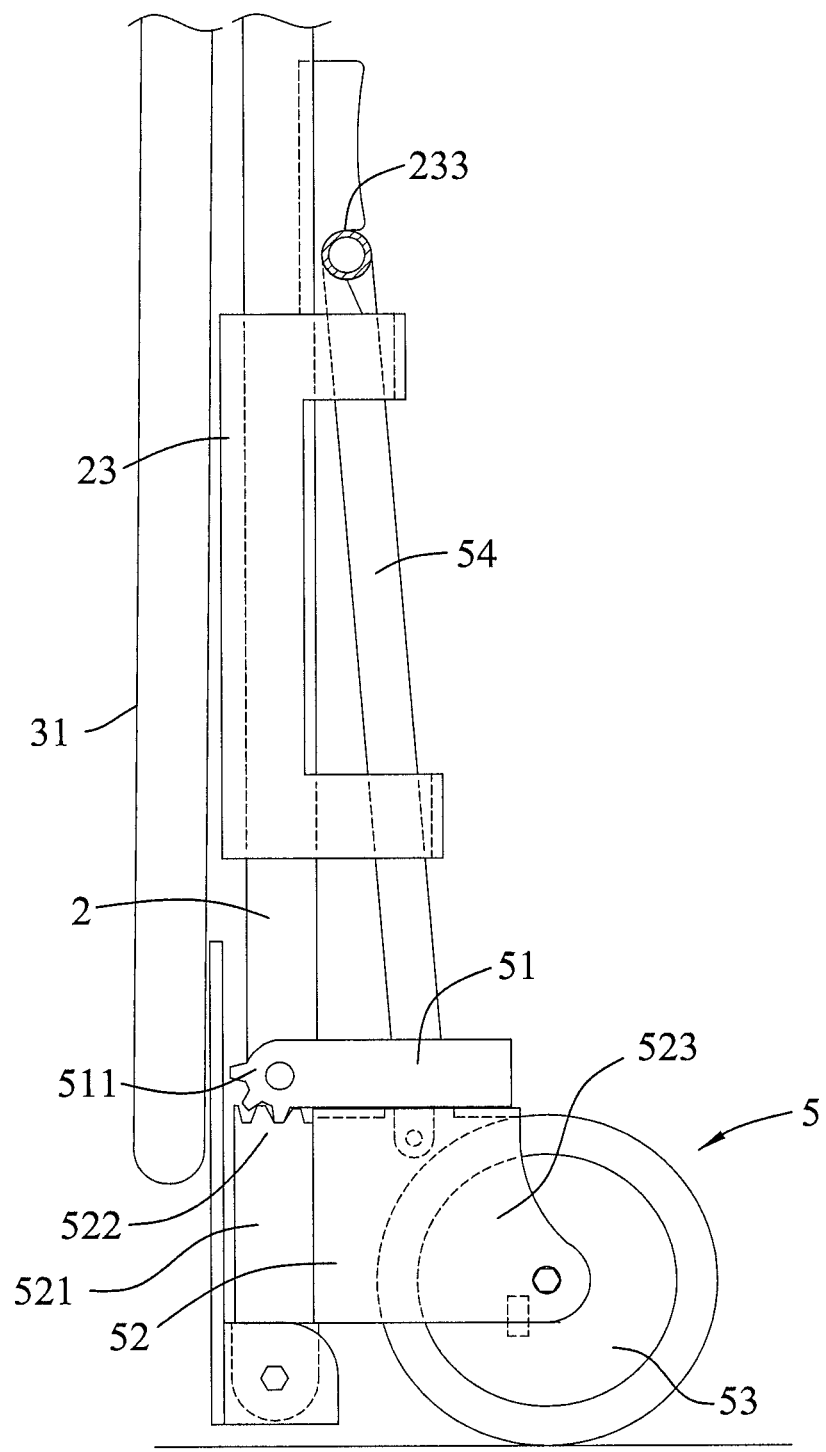
FIG. 10 is a fragmentary, schematic side view illustrating a wheel unit of the first embodiment in an expanding state.
Figure 11:
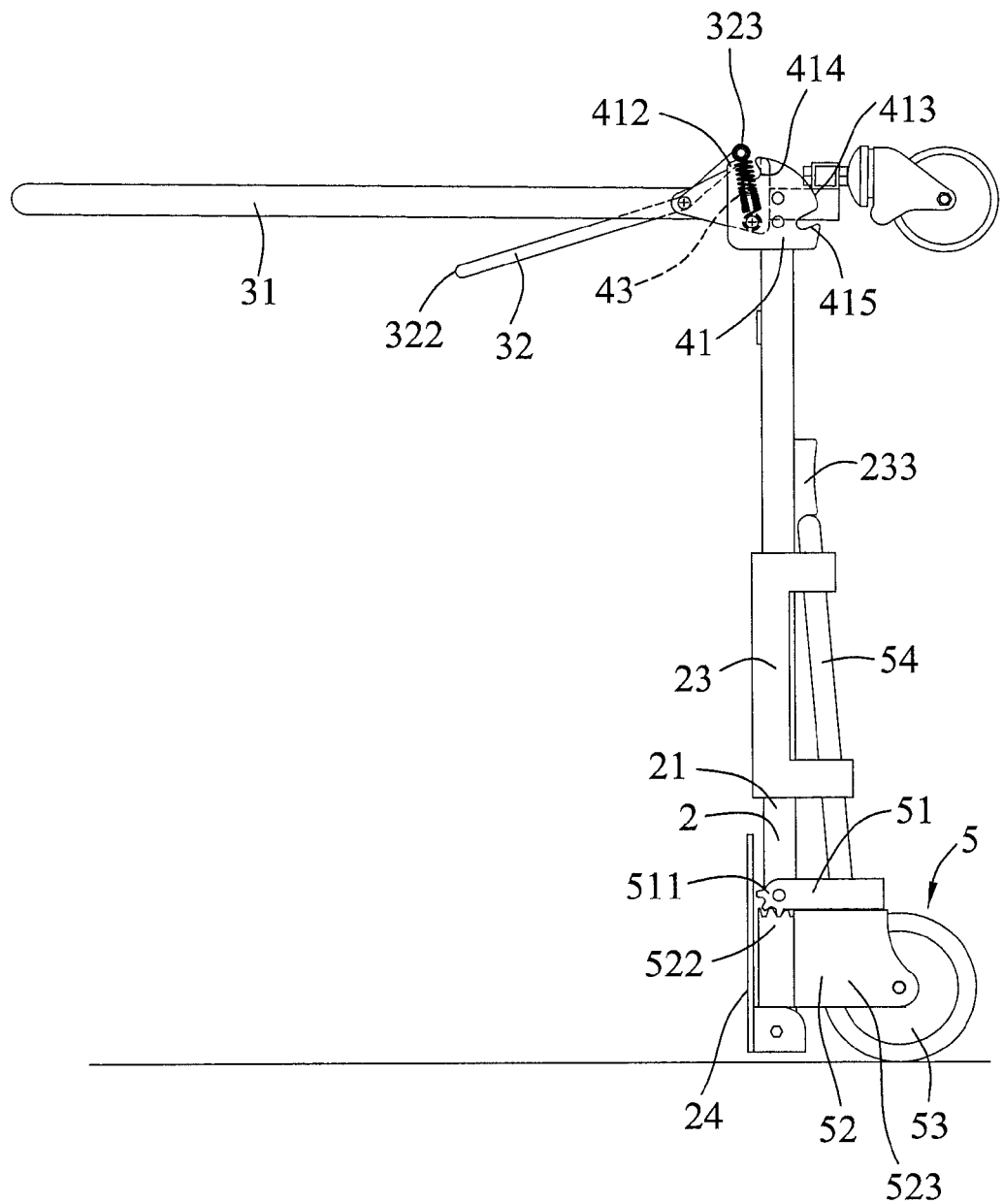
FIG. 11 is a schematic side view illustrating an interim state indicating that the first embodiment is being converted from the folded state to the platform cart state.

Referring to FIGS. 5, 10 and 11, when it is desired to convert the hand truck from a folded state, as shown in FIG. 5, to a platform cart state, as shown in FIG. 8, the driving member 54 is pushed downwardly and the second truck frame 31 is then turned upwardly. Specifically, movement of the operating portion of the driving member 54 toward the first end portions 26 results in turning of the rotary members 51 about the rotary axis and turning of the wheel mounts 52 about the first end portions 26 so as to bring the wheels 53 remote from each other, as shown in FIG. 10. At this time, the operating portion of the driving member 54 is retained in the recess 233 of the middle plate 23.

Figure 12:
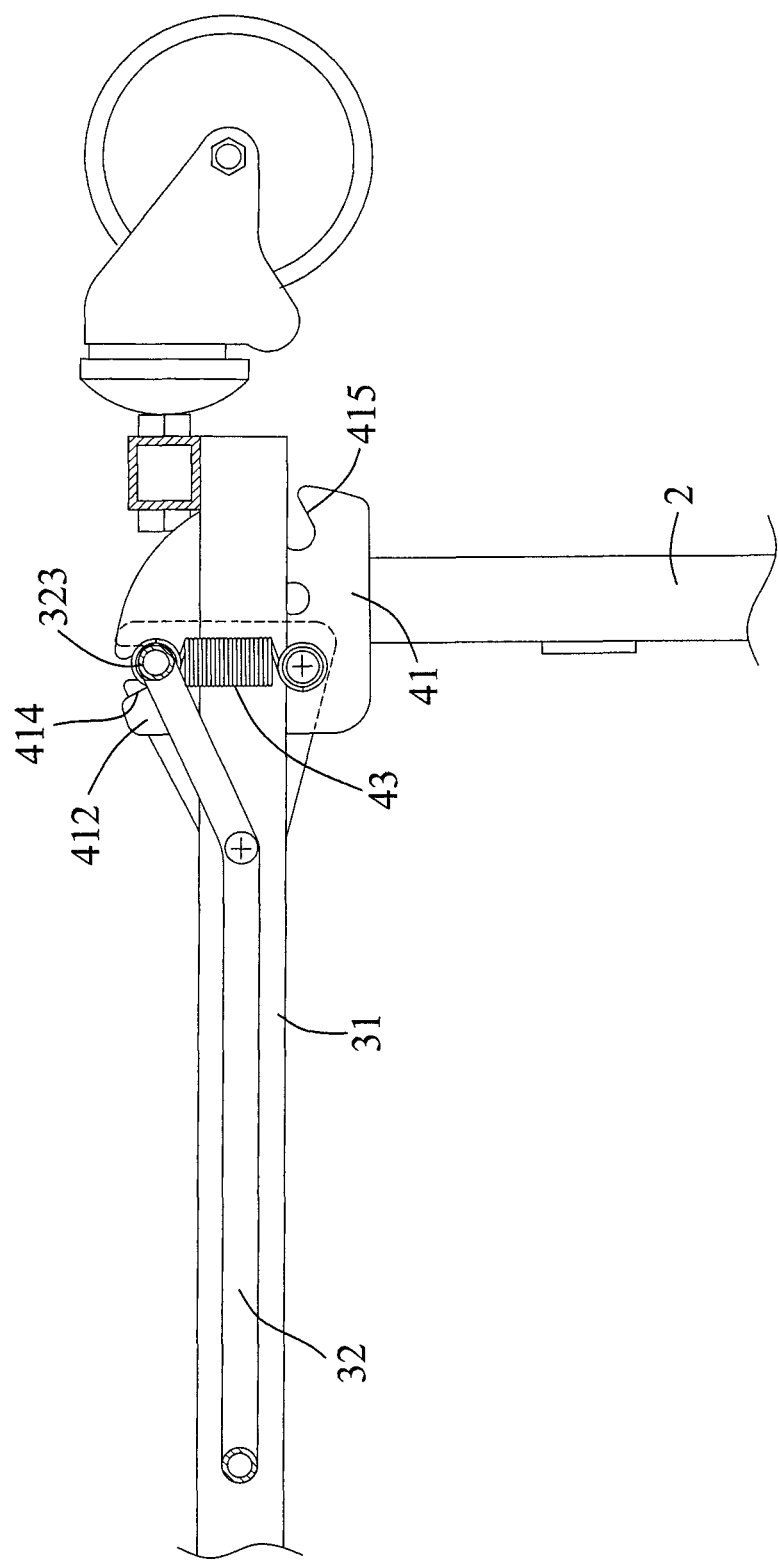
FIG. 12 is a fragmentary, partly sectional view illustrating that a stabilizing lever is retained to a platform-cart positioning groove according to the first embodiment.

Referring to FIGS. 5, 11 and 12, during upward turning of the second truck frame 31 relative to the first truck frame 2, the engaging crossbar (the weight end) 323 is moved near the fixed members 41 and is then released from the recesses 421 by means of the first arcuate surfaces 412 of the fixed members 41 so as to permit turning of the stabilizing lever 32 relative to the second truck frame 31 and so as to bring the gripping crossbar (power end) 322 lower than the engaging crossbar 323. Then the engaging crossbar 323 slides along the first arcuate surfaces 412 to be engaged in the platform-cart positioning grooves 414 by the biasing action of the biasing springs 43, as shown in FIG. 12, so as to retain the second truck frame 31 in the platform-cart position, where an extending plane defined by the second truck frame 31 is substantially perpendicular to that defined by the first truck frame 2 in this embodiment. Subsequently, the hand truck of this embodiment is tilted to place the wheel and roller units 5, 6 on a ground surface so as to convert to a platform cart state, as shown in FIG. 8.

Figure 13:
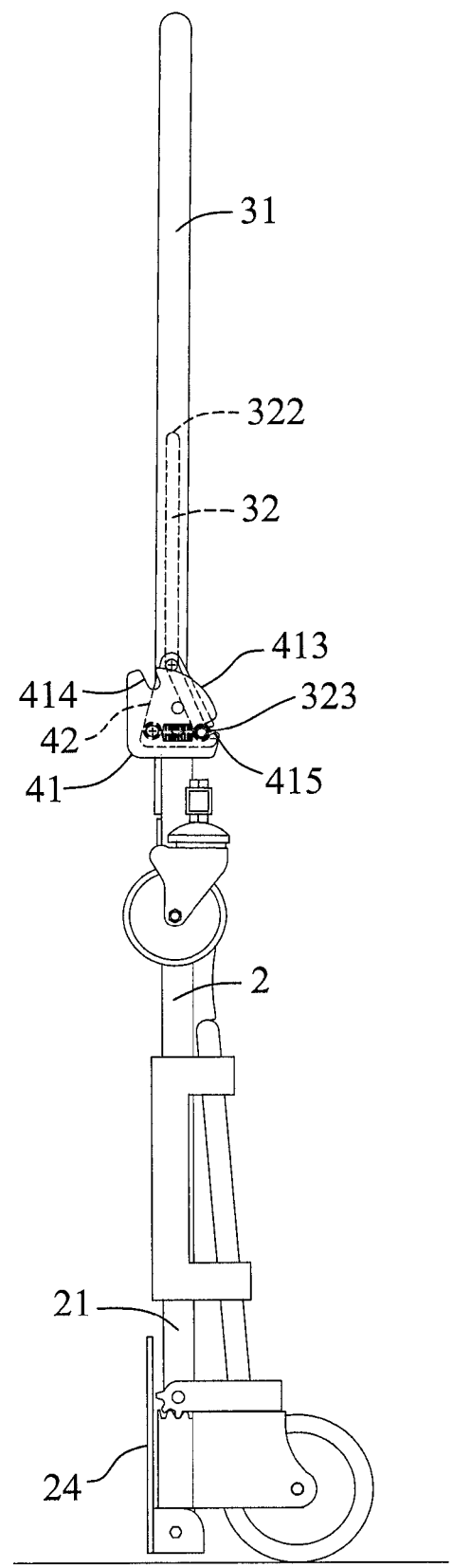
FIG. 13 is a schematic side view illustrating an interim state indicating that the first embodiment is being converted from the interim state shown in FIG. 11 to the reclined hand truck state shown in FIG. 9.
Figure 14:
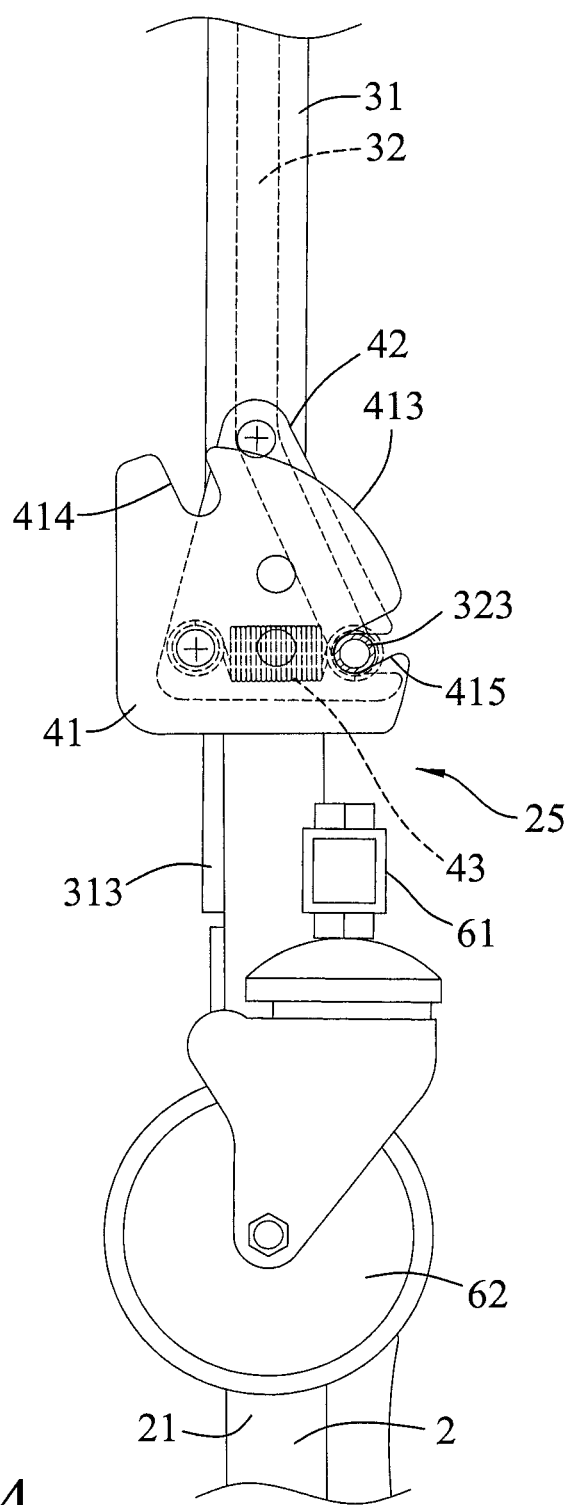
FIG. 14 is a fragmentary, enlarged view of a portion shown in FIG. 13.

Referring to FIGS. 11, 13 and 14, when it is desired to convert the hand truck from the platform cart state to a reclined hand truck state, the hand truck of this embodiment is first turned to the state shown in FIG. 11. Subsequently, a downward push is applied to the gripping crossbar (power end) 322 to turn about the second pivot axis, which results in movement of the engaging crossbar (weight end) 323 away from the platform-cart positioning grooves 414. The second truck frame 31 is turned upwardly to the reclined-truck position, as shown in FIG. 13. The engaging crossbar 323 is simultaneously moved, slides along the second arcuate surface 413, and is then retained in the reclined-truck positioning grooves 415 by means of the biasing springs 43, as shown in FIG. 14. Finally, the toe plate 24 is turned away from the side rails 21 for supporting loads 9 thereon, as shown in FIG. 9.

Figure 9:
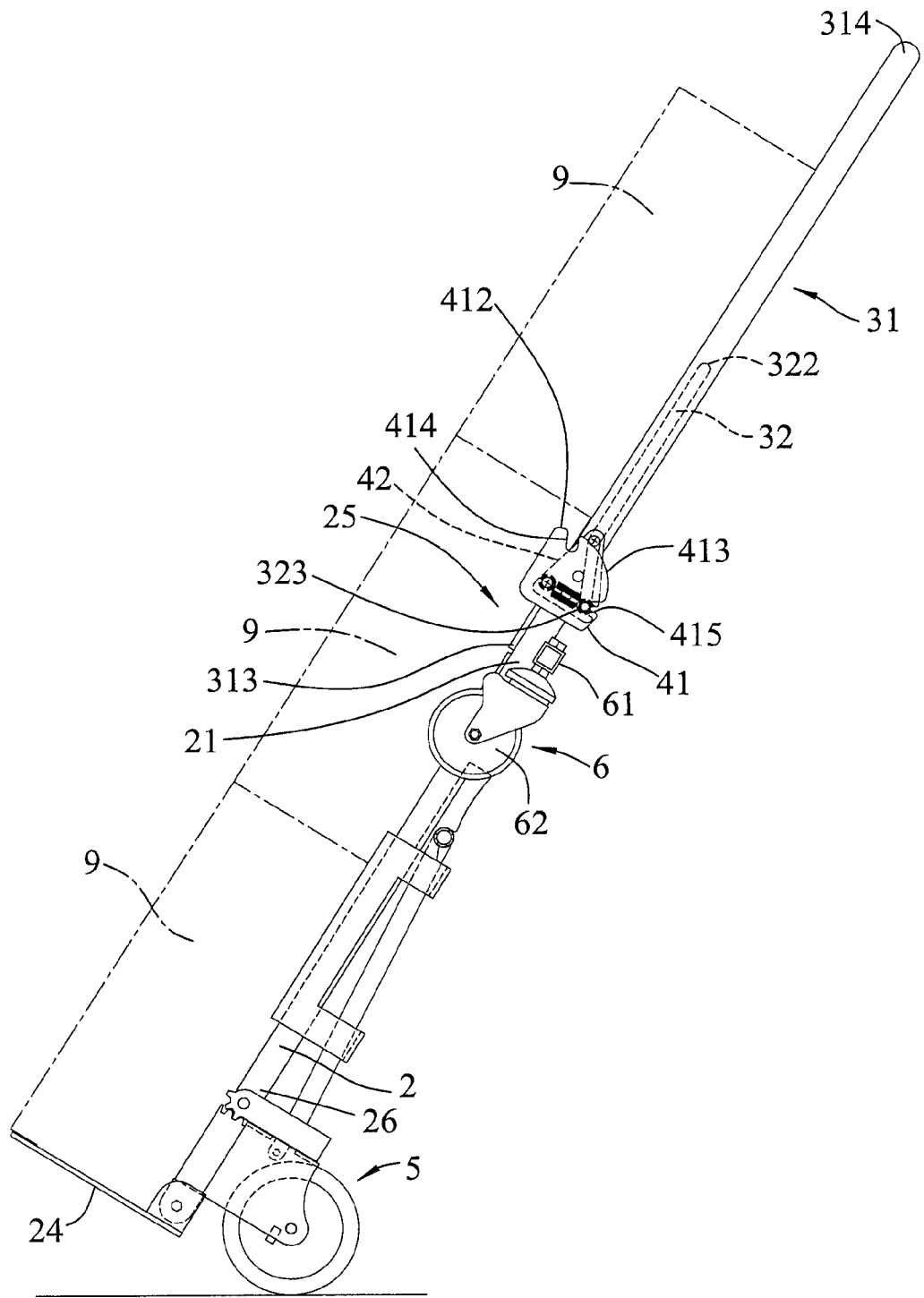
FIG. 9 is a schematic side view illustrating the first embodiment in a reclined hand truck state.

Referring to FIGS. 5, 9 and 11, when it is desired to return the hand truck of this embodiment from the state shown in FIG. 9 to the folded state, the toe plate 24 is turned toward the first truck frame 2, and the gripping crossbar 322 is then pushed downwardly to release the engaging crossbar 323 from the reclined-truck positioning grooves 415. Subsequently, the second truck frame 31 is turned downwardly such that the engaging crossbar 323 is moved to slide along the second arcuate surfaces 413 and over the platform-cart positioning grooves 414 to be placed in the state shown in FIG. 11. The second truck frame 31 is in turn moved downwardly and the engaging crossbar 323 slides along the first arcuate surfaces 412 to return to the folded state shown in FIG. 5.

Referring to FIGS. 5, 9 and 14, the second truck frame 31 and the pivoting members 42 are disposed such that, when the second truck frame 31 is moved from the folded position to the reclined-truck position, the second pivot axis (about which the stabilizing lever 32 is pivoted to the second truck frame 31 or the pivoting members 42) is moved from a proximate position, where the second pivot axis is closer to the first end portions 26 than the first pivot axis (about which the pivoting members 42 are pivoted to the fixed members 41), to a distal position, where the second pivot axis is remoter from the first end portions 26 than the first pivot axis. Thus, the second truck frame 31 extends parallel to and outwardly from the first truck frame 2 in the reclined-truck position so as to expand and enlarge the carrying area of the hand truck.

Further, in this embodiment, the two rollers 62 are coupled with the second pivot end portions 313 of the second truck frame 31 through the roller mounting crossbar 61. In the reclined hand truck state, as shown in FIG. 9, the rollers 62 are disposed laterally of the side rails 21 of the first truck frame 2 to thereby avoid protruding rearwardly so as to prevent the user from bumping thereagainst. Alternatively, the roller unit 6 can be coupled with the first pivot end portions 25 of the first truck frame 2 to have the roller mounting crossbar 61 connected to the side rails 21.

As illustrated, by virtue of the fixed members 41 and the pivoting members 42 connected to the first truck frame 2 and the second truck frame 31, the convertible hand truck can be readily operated to convert to any one of the folded, platform cart and reclined hand truck states. The second truck frame 31 extends parallel to and outwardly from the first truck frame 2 in the reclined-truck position so as to expand and enlarge the carrying area of the hand truck. In addition, the wheel unit 5 and the roller unit 6 are connected to the first and second truck frames 2, 31 without additional pivoting elements, which renders the use of the hand truck safer.

Figure 15:
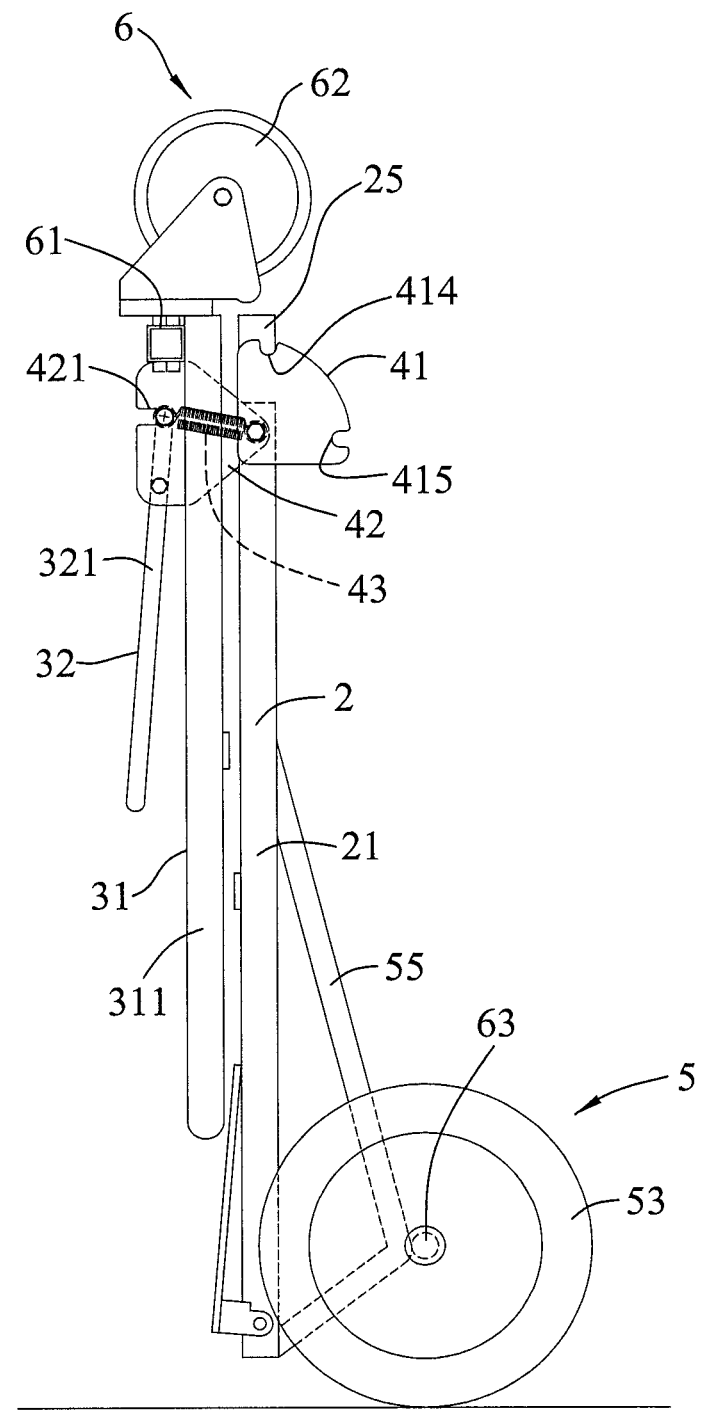
FIG. 15 is a schematic side view illustrating that a second embodiment of a convertible hand truck according to the disclosure is in a folded state.
Figure 16:
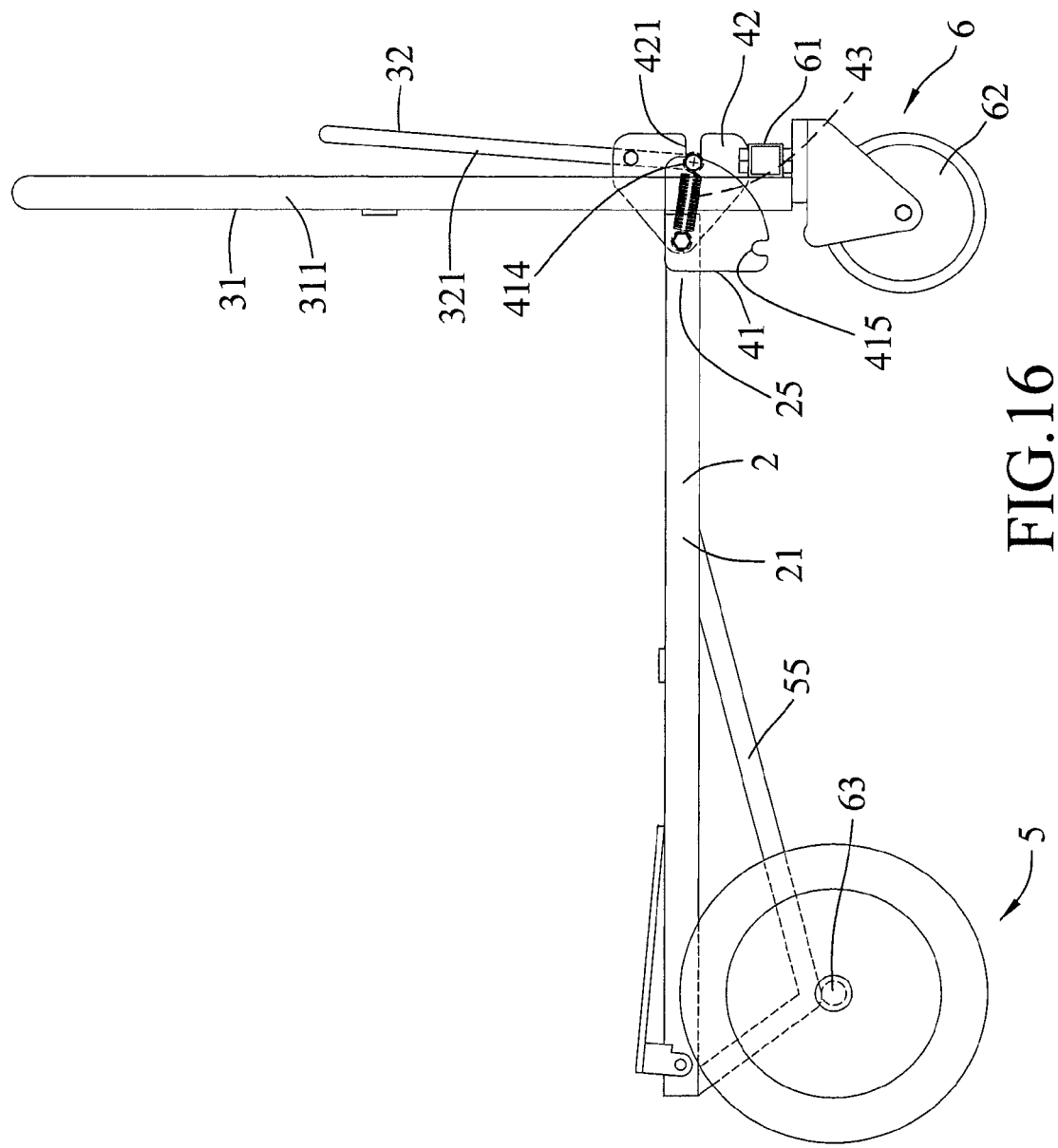
FIG. 16 is a schematic side view illustrating the second embodiment in a platform cart state.
Figure 17:
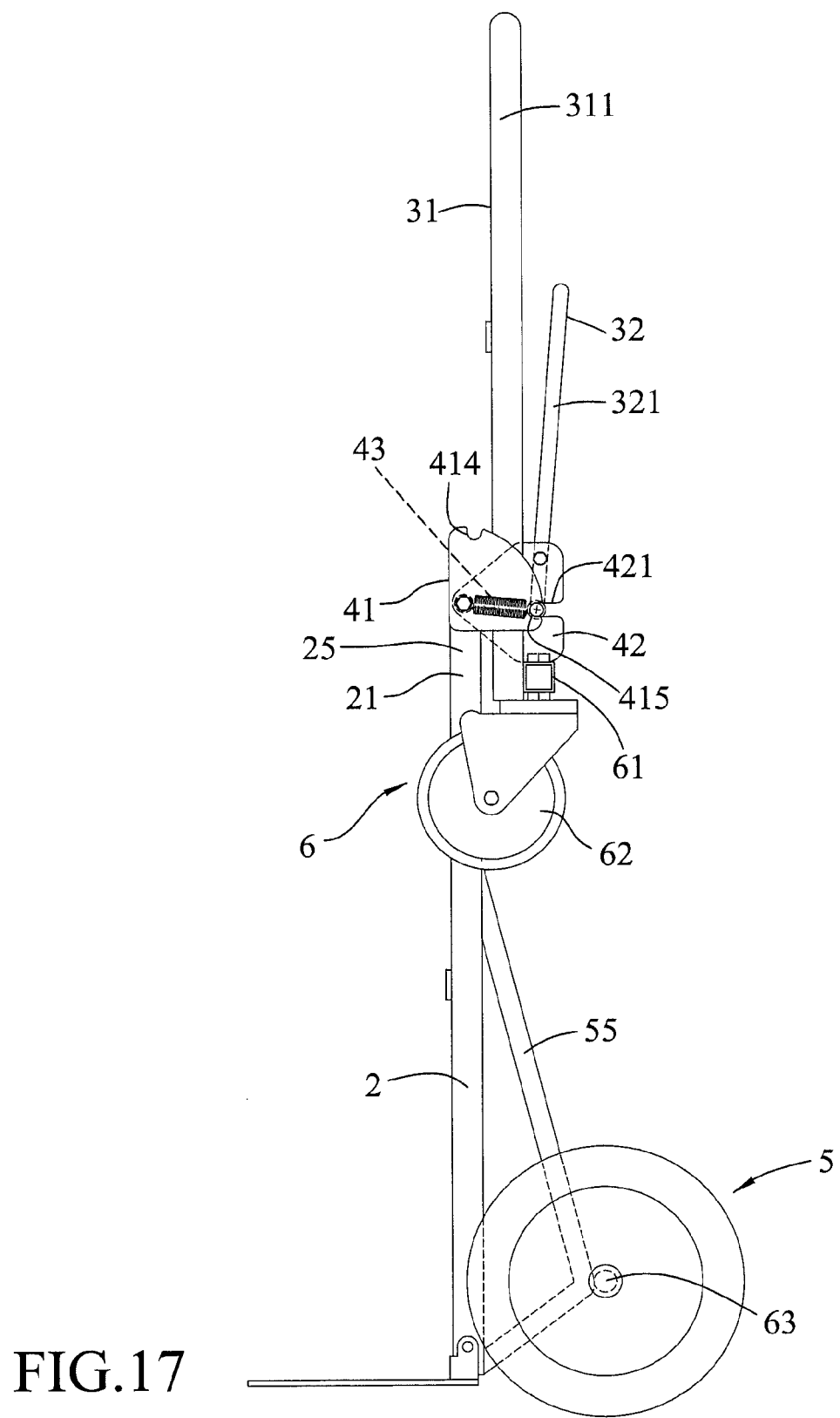
FIG. 17 is a schematic side view illustrating the second embodiment in a reclined hand truck state.

Referring to FIGS. 15 to 17, a second embodiment of the convertible hand truck according to this disclosure is shown. The second side rods 321 of the stabilizing lever 32 are respectively and pivotably connected with the pivoting members 42 instead of being pivotably connected with the first side rods 311. The pivoting members 42 are respectively soldered with the first side rods 311 at the central portions thereof. In this embodiment, a middle plate is omitted. Unlike the wheel unit 5 having the rotary members 51, the wheel mounts 52 and the driving member 54 as in the first embodiment, the wheel unit 5 of this embodiment includes a pair of triangular mounts 55 connected to the side rails 21 by soldering, and a wheel axle 63 interconnecting the triangular mounts 55 by soldering for mounting a pair of wheels 53. The hand truck of this embodiment can be converted to perform different states of use as described in the above embodiment.

Figure 18:
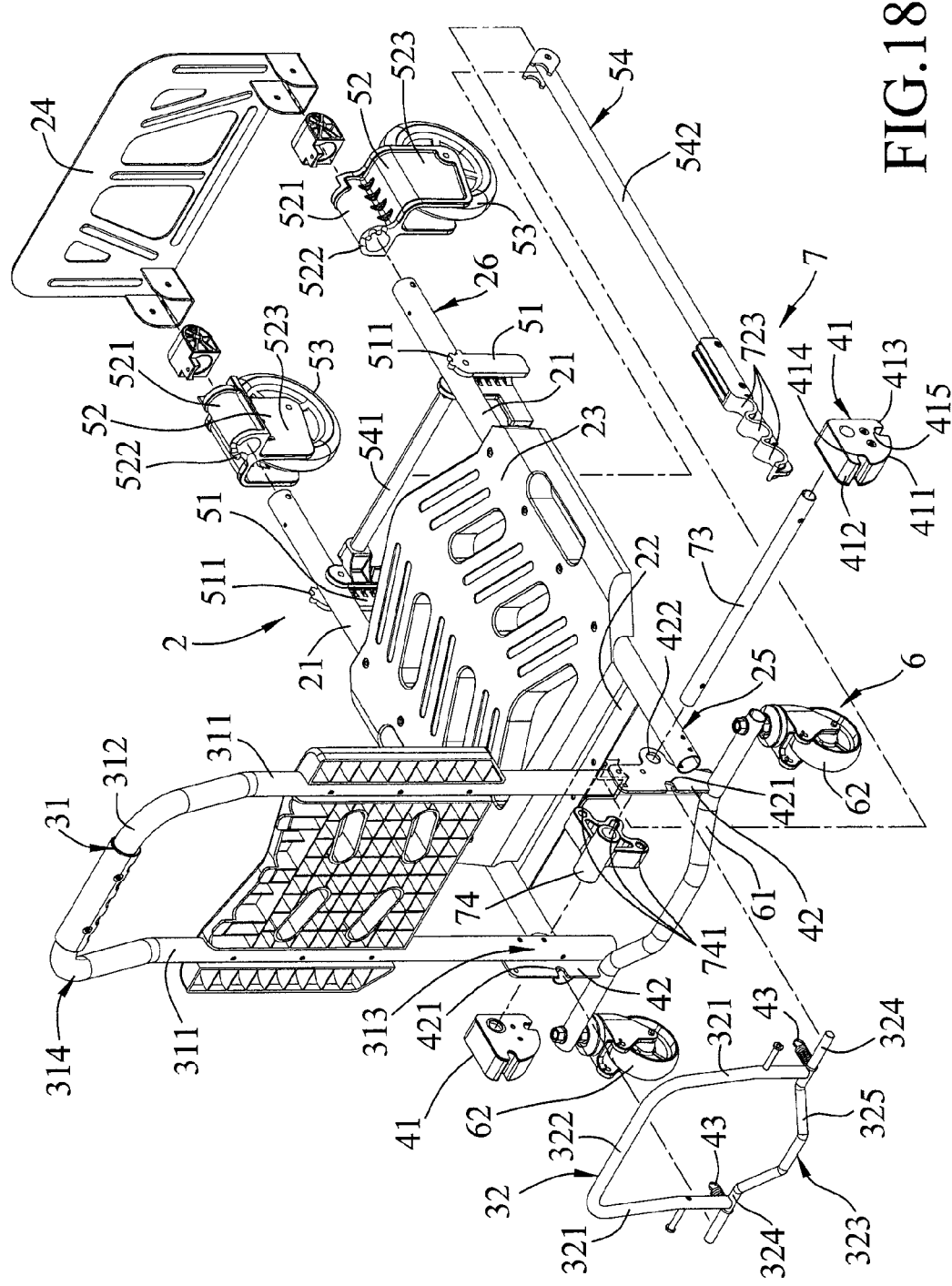
FIG. 18 is an exploded perspective view of a third embodiment of a convertible hand truck according to the disclosure.
Figure 19:
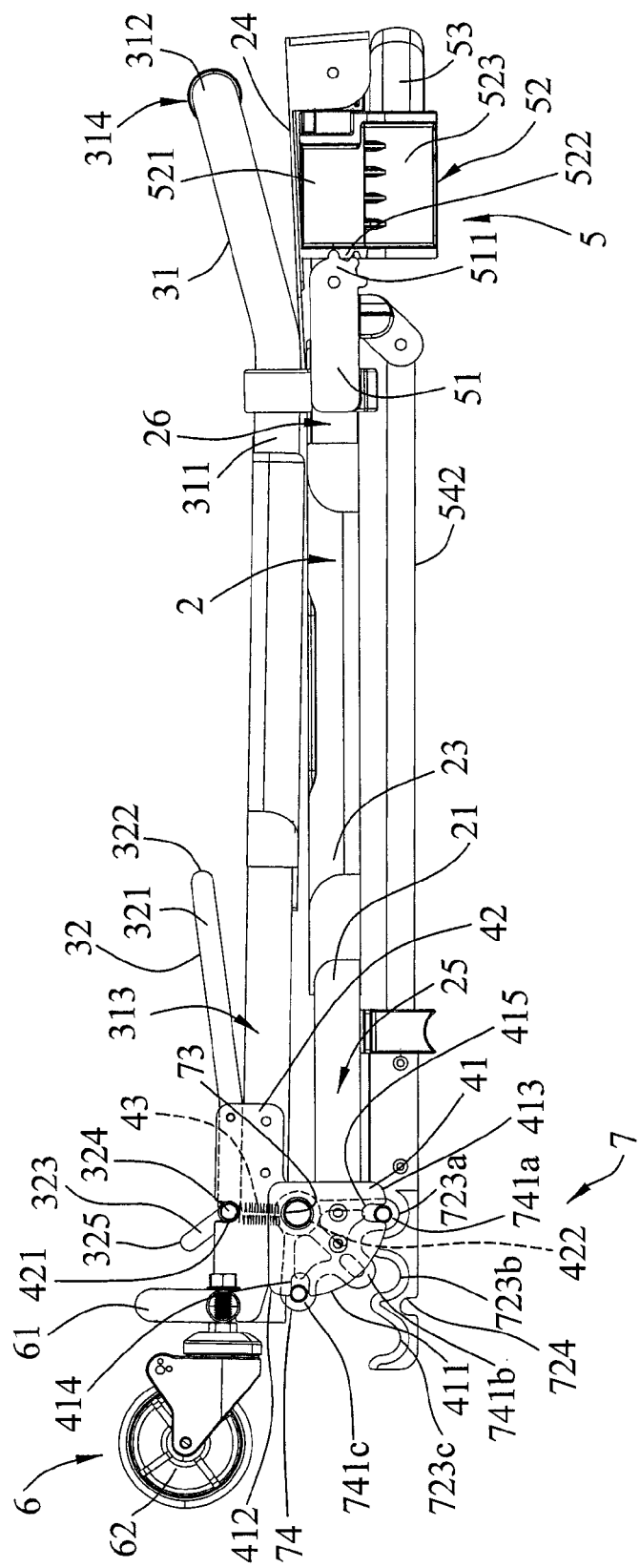
FIG. 19 is a schematic side view of the third embodiment in a folded state.
Figure 20:
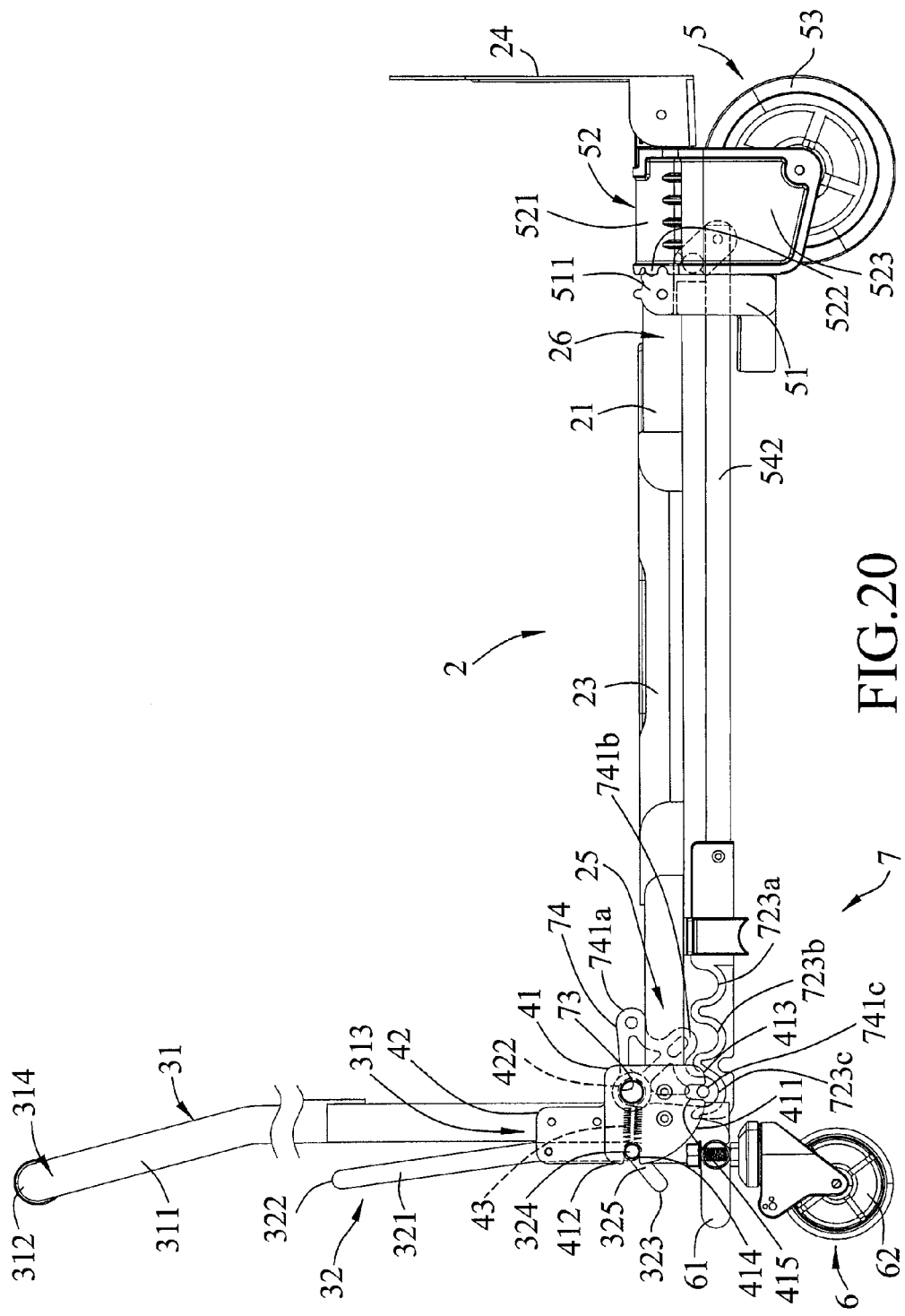
FIG. 20 is a schematic side view illustrating the third embodiment in a platform cart state.

Referring to FIGS. 18 to 20, the convertible hand truck of a third embodiment according to this disclosure is shown. In this embodiment, the wheel unit 5 is disposed to be operated in response to the turning of the second truck frame 31 relative to the first truck frame 2. Specifically, the driving member 54 includes a connecting bar 541 interconnecting the rotary members 51 to serve as the connecting portion, and a driving rod 542 extending from the connecting bar 541 toward the first pivot end portions 25 to serve as the operating portion. The wheel unit 5 further includes a rotary crossbar 73 having two ends engaged in two holes 422 in the pivoting members 42 so as to rotate about its axis in the left-and-right direction along with the turning of the second truck frame 31, and a force translating mechanism 7 disposed between the rotary crossbar 73 and the driving rod 542 to translate rotary movement of the rotary crossbar 73 into the movement of the driving rod 542 toward the first end portions 26.

Figure 21:
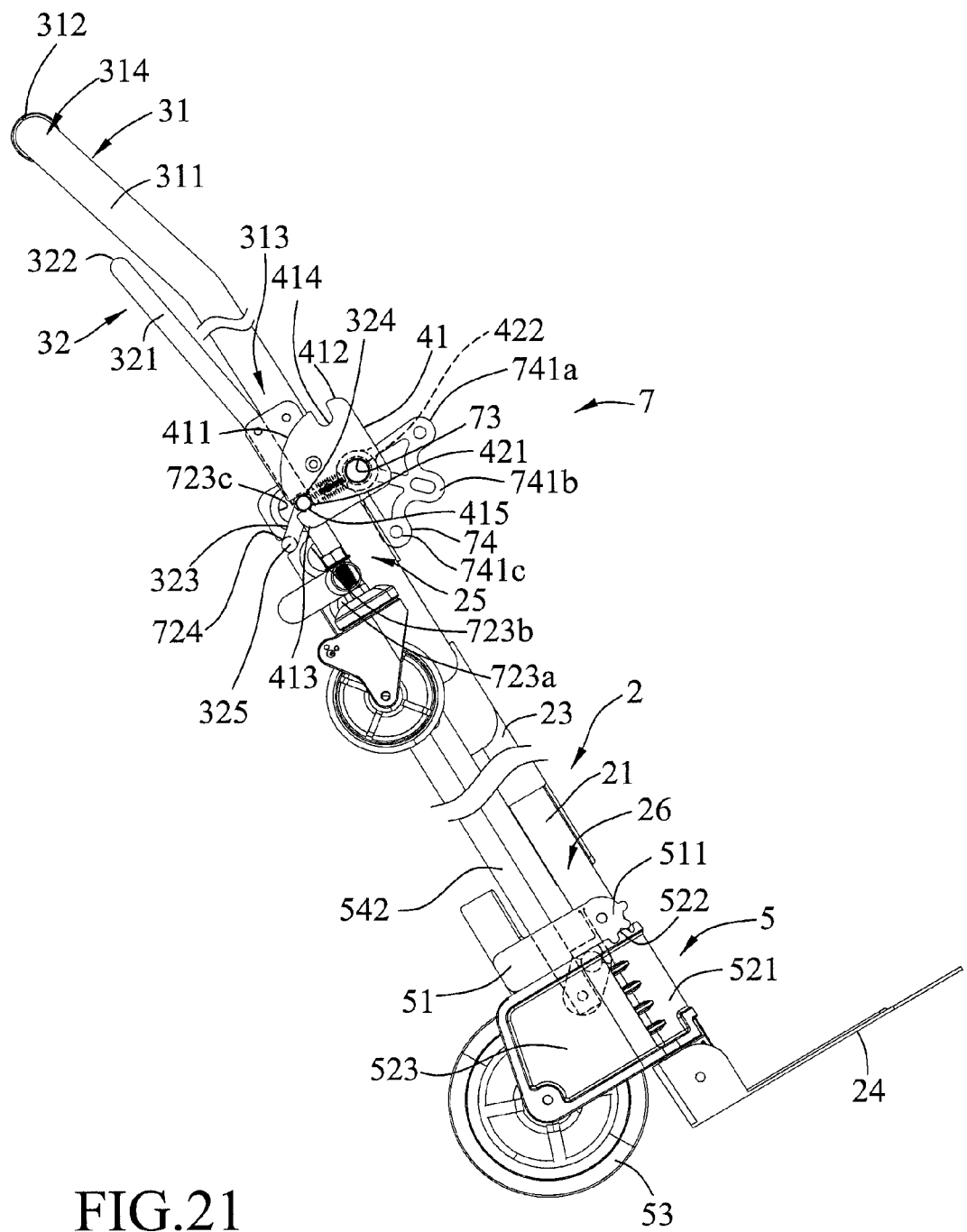
FIG. 21 is a fragmentary, schematic side view illustrating the third embodiment in a reclined hand truck state.

The force translating mechanism 7 includes a revolving member 74 which is sleeved on the rotary crossbar 73 to be rotated therewith and which has a plurality of driving teeth 741 (three are shown) that are angularly displaced from each other about the axis of the rotary crossbar, and a plurality of driven grooves 723 formed in the driving rod 542 and displaced from each other in the first direction such that, when the revolving member 74 is rotated along with the turning of the second truck frame 31, one of the driving teeth 741 is engaged with a respective one of the driven grooves 723 so as to make the movement of the driving rod 542. As shown in FIG. 19, the driving rod 542 has a retaining groove 724 adjacent to the driven grooves 723. The engaging crossbar 323 of the stabilizing lever 32 is configured to have two engaging segments 324 extending from the second side rods 321 in the left-and-right direction, and a middle curved segment 325 disposed to be retained in the retaining groove 724 when the second truck frame 31 is in the reclined-truck position, as shown in FIG. 21.

In this embodiment, each of the biasing springs 43 is disposed between the engaging crossbar 323 and the rotary crossbar 73. The roller mounting crossbar 61 of the roller unit 6 is disposed to interconnect the pivoting members 42.

In the folded state shown in FIG. 19, the engaging segments 324 are retained in the recesses 421 of the pivoting members 42, and one of the driving teeth 741 (741a) is engaged with one of the driven grooves 723 (723a).

When the second truck frame 31 is turned from the folded position to the platform cart position shown in FIG. 20, the revolving member 74 is rotated along with the turning of the pivoting members 42 and the rotation of the rotary crossbar 73 such that the engaged driving tooth (741a) is disengaged from the driven groove (723a) while the driving rod 542 is moved toward the first end portions 26 to permit engagement of the next driving tooth (741b) with the driven groove (723b). To resume turning, the driving rod 542 is further moved toward the first end portions 26 while the driving tooth (741c) is engaged with the driven groove (723c). The movement of the driving rod 542 causes the turning of the rotary members 51 about the rotary axis and the turning of the wheel mounts 52 about the side rails 21 so as to turn the wheels 53 away from each other.

With such construction, the rollers 62 and the wheels 53 can stand on the same plane by only turning the second truck frame 31 to the platform cart position (i.e. the carrying surface of the first truck frame 2 can be kept horizontal). At the same time, the engaging segments 324 of the engaging crossbar 323 are retained in the platform-cart positioning grooves 414 and the driving tooth (741c) is engaged in the driven groove (723c).

Figure 22:
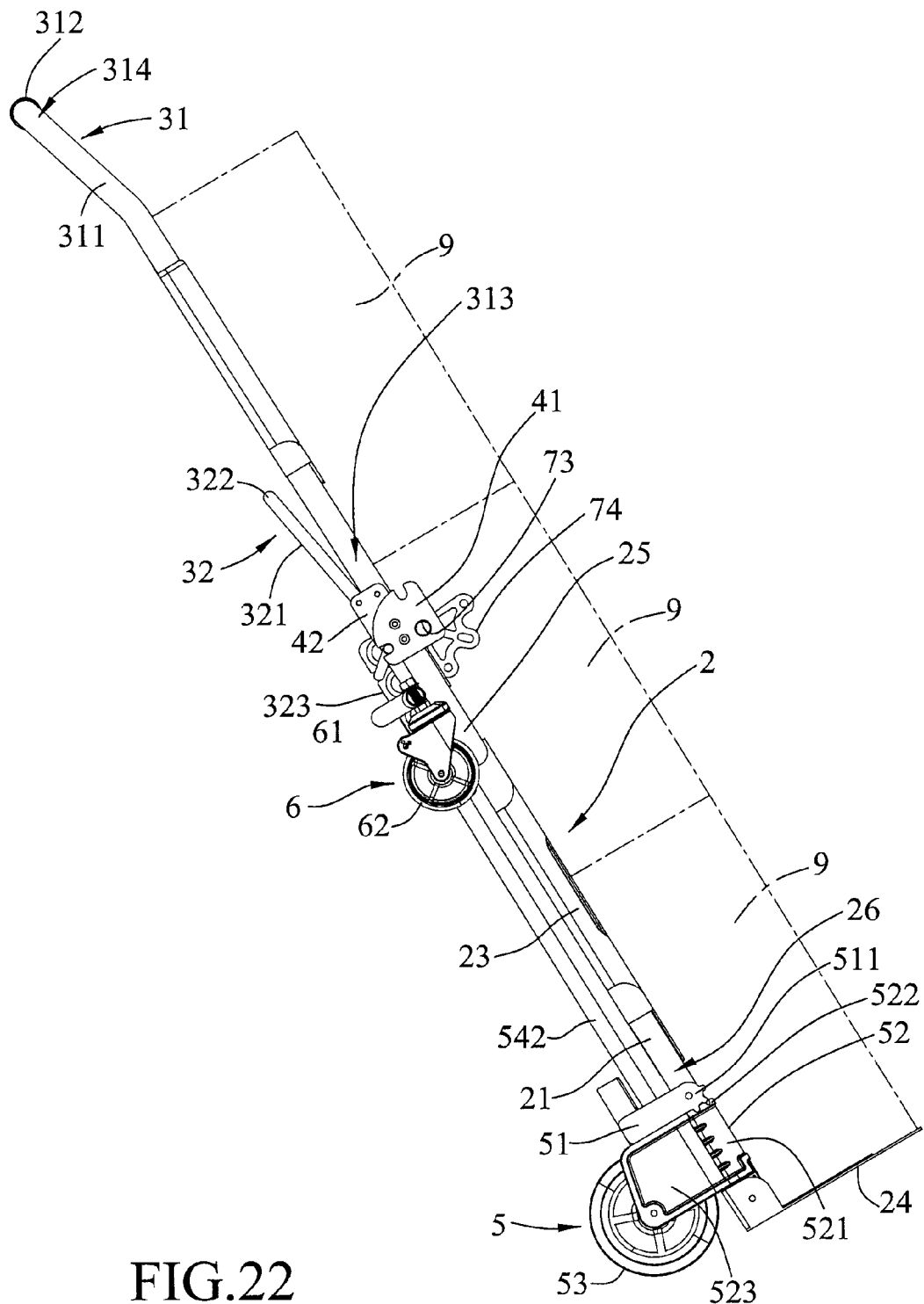
FIG. 22 is a schematic side view illustrating the third embodiment in a state of use.

Referring to FIGS. 20 to 22, a downward push is applied to the gripping crossbar (power end) 322 of the stabilizing lever 32 to remove the engaging segments 324 from the platform-cart positioning grooves 414. Subsequently, the second truck frame 31 is further turned to permit the second end portions 314 to be remote from the first end portions 26 so as to place the hand truck in the reclined hand truck state, as shown in FIGS. 21 and 22. In this state, the second truck frame 31 extends parallel to and outwardly from the first truck frame 2 so as to expand and enlarge the carrying area of the hand truck for more loads 9. The engaging segments 324 of the engaging crossbar 323 are retained in the reclined-truck positioning grooves 415 and the middle curved segment 325 is retained in the retaining groove 724 to keep the driving rod 542 unmoved. The revolving member 74 is separated from the driving rod 542.

As illustrated, the hand truck of this embodiment can be readily converted among the folded state, the platform cart state and reclined hand truck state. The retaining engagement of the revolving member 74 with the driving rod 542 results in stabilization of the wheels 53 and thereby prevents inadvertent folding thereof. The middle curved segment 325 is retained in the retaining groove 724 even when the revolving member 74 is separated from the driving rod 542, and an undesired movement of the driving rod 542 is hence prevented.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A convertible hand truck comprising:
    a first truck frame having a pair of first pivot end portions opposite to each other in a left-and-right direction, and a pair of first end portions disposed opposite to said first pivot end portions, respectively, in a first direction transverse to the left-and-right direction;
    a second truck frame having a pair of second pivot end portions opposite to each other in the left-and-right direction, and a pair of second end portions disposed opposite to said second pivot end portions, respectively, in a second direction transverse to the left-and-right direction;
    a pair of fixed members disposed outboard of said first pivot end portions, respectively;
    a pair of pivoting members disposed outboard of said second pivot end portions, respectively, and each pivotably connected with a respective one of said fixed members about a first pivot axis in the left-and-right direction such that said second truck frame is turnable relative to said first truck frame among a folded position, where said second end portions are close to said first end portions to coincide the second direction with the first direction, a platform-cart position, where the second direction is transverse to the first direction, and a reclined-truck position, where said second end portions are remote from said first end portions to coincide the second direction with the first direction;
    each of said fixed members having a platform-cart positioning groove and a reclined-truck positioning groove angularly displaced from each other about a second pivot axis that is parallel to and offset from the first pivot axis;
    a stabilizing lever pivotably connected with either said second truck frame or said pivoting members about the second pivot axis, and having a weight end and a power end which are disposed at two opposite sides of the second pivot axis such that said weight end is disposed to be engaged with respective ones of said platform-cart positioning grooves and said reclined-truck positioning grooves when said second truck frame is in a respective one of the platform-cart position and the reclined-truck position, and such that, in response to a turning movement of said second truck frame about the first pivot axis, said power end is turned about the second pivot axis to move said weight end toward respective ones of said platform-cart positioning grooves and said reclined-truck positioning grooves, and, in response to a turning movement of said power end, said weight end is disengaged from the respective ones of said platform-cart and reclined-truck positioning grooves to permit the turning movement of said second truck frame toward the folded position;

a wheel unit coupled with said first end portions; and a roller unit coupled with ones of said first pivot end portions, said second pivot end portions and said pivoting members.

2. The convertible hand truck as claimed in claim 1, wherein said second truck frame having a pair of first side rods spaced apart from each other and extending in the second direction to have said second pivot end portions and said second end portions, and a first grip rod interconnecting said second end portions, said stabilizing lever having a pair of second side rods which are pivotably connected with either said first side rods or said pivoting members, an engaging crossbar which interconnects ends of said second side rods to serve as said weight end, and a gripping crossbar which interconnects opposite ends of said second side rods to serve as said power end.

3. The convertible hand truck as claimed in claim 2, further comprising a pair of biasing springs disposed to bias said engaging crossbar toward said fixed members so as to engage said engaging crossbar in respective ones of said platform-cart and reclined-truck positioning grooves.

4. The convertible hand truck as claimed in claim 1, wherein said roller unit includes a roller mounting crossbar interconnecting said second pivot end portions, and two rollers rotatably mounted on said roller mounting crossbar.

5. The convertible hand truck as claimed in claim 1, wherein said wheel unit includes a pair of wheel mounts respectively sleeved on said first end portions, and two wheels respectively and pivotably mounted on said wheel mounts such that said wheel mounts are turnable relative to said first truck frame to bring said wheels close to or remote from each other.

6. The convertible hand truck as claimed in claim 5, wherein said wheel unit further includes a pair of rotary members each pivotably mounted on said first truck frame about a rotary axis in the left-and-right direction and meshed with a respective one of said wheel mounts, a driving member having a connecting portion which is connected to said rotary members and an operating portion which is disposed close to said first pivot end portions such that movement of said operating portion toward said first end portions results in turning of said rotary members about the rotary axis and turning of said wheel mounts about said first end portions so as to move said wheels remote from each other.

7. The convertible hand truck as claimed in claim 6, wherein said wheel unit further includes a rotary crossbar disposed to rotate about its axis in the left-and-right direction along with the turning of said second truck frame, and a force translating mechanism disposed between said rotary crossbar and said operating portion to translate rotary movement of said rotary crossbar into the movement of said operating portion toward said first end portions.

8. The convertible hand truck as claimed in claim 7, wherein said force translating mechanism includes a revolving member which is sleeved on said rotary crossbar to be rotated therewith and which has a plurality of driving teeth that are angularly displaced from each other about the axis of said rotary crossbar, and a plurality of driven grooves formed in said operating portion and displaced from each other in the first direction such that, when said revolving member is rotated along with the turning of said second truck frame, one of said driving teeth is engaged with a respective one of said driven grooves so as to make the movement of said operating portion.

9. The convertible hand truck as claimed in claim 8, wherein said operating portion has a retaining groove adjacent to said driven grooves, said stabilizing lever having a pair of second side rods which are respectively and pivotably connected with said pivoting members, an engaging crossbar which interconnects ends of said second side rods to serve as said weight end, and a gripping crossbar which interconnects opposite ends of said second side rods to serve as said power end, said engaging crossbar being configured to have two engaging segments extending from said second side rods in the left-and-right direction to be engaged with respective ones of said platform-cart positioning grooves or said reclined-truck positioning grooves, and a middle curved segment disposed to be retained in said retaining groove when said second truck frame is in the reclined-truck position.

10. The convertible hand truck as claimed in claim 1, wherein said second truck frame and said pivoting members are disposed such that, when said second truck frame is moved from the folded position to the reclined-truck position, the second pivot axis is moved from a proximate position, where the second pivot axis is closer to said first end portions than the first pivot axis, to a distal position, where the second pivot axis is remoter from said first end portions than the first pivot axis, such that said second truck frame extends parallel to and outwardly from said first truck frame in the reclined-truck position.

* * * * *